United States Patent [19]

Chattha

[11] 4,307,208

[45] Dec. 22, 1981

[54] COMPOSITION WITH LATENT REACTIVE CATALYST

[75] Inventor: Mohinder S. Chattha, Livonia, Mich.

[73] Assignee: Ford Motor Company, Dearborn, Mich.

[21] Appl. No.: 109,438

[22] Filed: Jan. 4, 1980

[51] Int. Cl.³ .................. C08L 61/28; C08L 37/00
[52] U.S. Cl. ........................... 525/161; 525/110; 525/158; 525/162; 525/438; 525/511; 525/513; 528/90; 528/109
[58] Field of Search ............... 525/110, 161, 162, 158, 525/438, 511, 513; 528/90, 109

[56] References Cited

U.S. PATENT DOCUMENTS

| | | | |
|---|---|---|---|
| 4,083,830 | 4/1978 | Gallacher | 260/67.6 |
| 4,083,892 | 4/1978 | Sekmakas | 260/855 |
| 4,137,389 | 1/1979 | Wingler | 526/86 |
| 4,181,784 | 1/1980 | Chattha et al. | 525/161 |
| 4,181,785 | 1/1980 | Chattha et al. | 525/161 |

*Primary Examiner*—Paul Lieberman

*Attorney, Agent, or Firm*—Roger L. May; Olin B. Johnson

[57] ABSTRACT

Thermosetting compositions comprising a film forming component bearing or capable of generating hydroxyl functionality, amine-aldehyde crosslinking agent, and a latent reactive catalyst comprising the reaction product of (i) a copolymer bearing pendent epoxy functionality, and (ii) a sulfonic acid having the formula

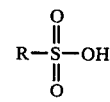

wherein R is selected from linear or branched alkyl groups and aryl groups.

Preferred compositions within the scope of the invention include high solids, thermosetting coating compositions suitable for automotive applications.

14 Claims, No Drawings

COMPOSITION WITH LATENT REACTIVE CATALYST

BACKGROUND OF THE INVENTION

This invention relates to compositions of the type comprising a film forming component and an amino compound, wherein the composition cures by reaction between the amino compound and hydroxyl functionality present on the film forming material. More particularly, the invention relates to thermosetting compositions of the aforementioned type wherein the composition includes a latent reactive catalyst for the hydroxyl/amino curing reaction.

Thermosetting compositions which cure by reaction of hydroxyl functionality with an amino compound are well known in the art. It is also well recognized in the art that it is desirable to catalyze the hydroxyl/amino crosslinking reaction in order to attain a quicker and more complete cure of the composition, particularly when the composition is to be used as a coating material. To this end, catalysts for this reaction have been developed and are also well known. Exemplary of the numerous known catalysts are p-toluene sulfonic acid and various organophosphate esters such as those taught by U.S. Pat. Nos. 3,960,979 and 4,018,848 to Khanna. In many compositions these catalysts also function as reactive catalysts.

While these known catalysts and reactive catalysts effectively catalyze the hydroxyl/amino reaction, they have several deficiencies. When necessary amounts of prior art catalysts are included in compositions curing via the hydroxyl/amino reaction, the compositions often lack shelf stability, resulting in premature crosslinking. Many prior art catalysts have a detrimental effect on pigments, thus resulting in color changes, and some of the known catalysts cause coagulation of the compositions. Still further, some of the known catalysts result in gassing when used in compositions including metallic pigments.

The compositions of this invention employ latent reactive catalysts, which generate the catalyst in situ and, thus, do not suffer from the aforementioned deficiencies.

Because the catalyst is generated in situ during cure, sufficient amounts of the latent reactive catalyst may be included in the composition in order to allow for rapid cure, without causing deleterious effects, including loss of shelf life.

Particularly preferred compositions within the scope of the invention are fast curing, high solids, thermosetting coating compositions. More particularly, these preferred compositions are adapted to provide an automotive topcoat which demonstrates hardness, high gloss, outstanding durability and excellent resistance to solvents and water. Still more particularly, the preferred compositions are fast curing, high solids, thermosetting coating compositions adapted to be used as automotive topcoats including metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance. Many of the proposed compositions have been particularly deficient as automotive topcoats, particularly when the topcoat is to include metallic flake as a pigment.

The deficiency in compositions including metallic flake results from excessive gassing as well as undesired reorientation of the metallic flake during application and cure of the coating. Flake reorientation results primarily because of the very low viscosity resins used in the paint compositions to accommodate high solids. The low viscosity is not sufficient to immobilize the flakes which tend to redistribute themselves to show "reverse flop" and nonuniform distribution.

The preferred coating compositions of this invention combine the above discussed desired properties and low application viscosity with rapid cure so as to overcome deficiencies of previously proposed high solids materials and thereby achieve a high solids coating composition particularly adapted for automotive topcoats and still more particularly adapted for automotive topcoats including metallic flake as a pigment.

SUMMARY OF THE INVENTION

It has been discovered that thermosetting compositions of the aforementioned type wherein the crosslinking reaction consists essentially of a reaction between hydroxy functionality and an amine-aldehyde compound are significantly improved when a latent reactive catalyst is included in the composition. This latent reactive catalyst is the reaction product of: (i) a copolymer bearing pendent epoxy functionality, having a number average molecular weight ($M_n$) of between about 1500 and about 10,000 and glass transition temperature (Tg) of between about $-25°$ C. and about $70°$ C., said copolymer being prepared from between about 5 and about 30 weight percent of monoethylenically unsaturated monomers bearing glycidyl functionality and between about 70 and about 95 weight percent of other monoethylenically unsaturated monomers; and (ii) a sulfonic acid having the formula

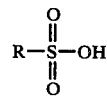

wherein R is selected from linear or branched alkyl groups and aryl groups.

As the composition is heated during the curing cycle, the latent reactive catalyst breaks down to form a sulfonic acid catalyst and a polymeric component which may or may not bear epoxy functionality which has not been previously reacted in the preparation of said latent reactive catalyst. At those reaction sites where sulfonic acid moieties become disconnected from the polymer as the composition is heated, ketones, aldehydes, or other organic groups may be formed. This polymeric material is of sufficient molecular weight that it is retained in the composition and becomes a part of the cured material.

The sulfonic acid catalyst generated from the latent reactive catalyst not only catalyzes the hydroxyl/amino reaction, but also may react with other functionality present on the film forming material of the composition, e.g., epoxy functionality, to generate hydroxyl functionality in situ. This hydroxyl functionality is then available to participate in the catalyzed hydroxyl/amino crosslinking reaction. The sulfonic acid also may react, of course, with any residual epoxy functionality on the polymeric component generated from the latent reactive catalyst. Any hydroxyl groups formed by such reaction would also be available to participate in the crosslinking reaction of the composition.

More specifically, the catalyzed compositions of the invention include the broad class of thermosetting compositions wherein hydroxyl functionality of the film forming component is crosslinked with conventional amine-aldehyde crosslinking agents. The hydroxyl functionality of the film forming material is either (i) initially present on the film forming material prior to reaction during cure of the composition, (ii) generated in situ on said film forming material during cure of said composition, or (iii) both initially present, and generated in situ. As will be more fully described hereinafter, the hydroxyl functionality of the film-forming material which may be generated in situ may be generated in any manner known to the art with respect to this type of composition or it may be generated by a reaction between the in situ generated catalyst itself and functionality in the film forming material, in particular, between the in situ generated catalyst and epoxy functionality on the film forming material. In this case, the generated catalyst serves as a reactant which helps generate the hydroxyl functionality subsequently engaged in the crosslinking reaction with the amino compound.

As noted above, the generated catalyst may also react with any residual epoxy on the polymeric material generated from decomposition of the latent reactive catalyst. This generated hydroxyl functionality is available for reaction during the catalyzed hydroxyl/amino curing reaction.

In general, the amount of latent reactive catalyst employed will vary between about 0.5 and about 10 weight percent based on the total weight of reactive components, including latent reactive catalyst, in the composition. It will be appreciated by those skilled in the art that this range is not critical to the broad applications of the invention.

The preferred coating compositions of the invention contain greater than about 55 percent by weight of nonvolatile solids, preferably greater than about 60 percent by weight, and are capable of curing rapidly at low temperature. These compositions, exclusive of pigments, solvents and other nonreactive components, consist essentially of: (A) a film-forming resin bearing epoxy functionality, or both epoxy and hydroxyl functionality; (B) the latent reactive catalyst described above; (C) an amine-aldehyde crosslinking agent; and (D) up to about 45 weight percent based on the total of (A), (B), (C) and (D) of a hydroxy functional additive.

The latent reactive catalyst is included in these preferred compositions in an amount ranging from about 1 to about 5 weight percent based on the total weight of (A), (B), (C) and (D) discussed above. The amine-aldehyde crosslinking agent in these preferred compositions is included in an amount ranging from about 15 to about 45 weight percent based on the total weight of (A), (B), (C) and (D).

Other ingredients of these preferred compositions may include additives such as catalysts, antioxidants, U.V. absorbers, flow control or wetting agents, antistatic agents, pigments, plasticizers, solvents, etc.

RELATED APPLICATIONS

Other applications covering compositions comprising latent reactive sulfonic acid catalysts, which are commonly assigned with this application, are U.S. Ser. Nos. 109,591, 109,599, 109,448 and 109,437 bearing the titles "Composition with Latent Reactive Catalyst"—#1, —#2, —#4 and —#5 respectively, all filed concurrently with this application.

PRIOR ART

U.S. Pat. No. 2,227,708 to Cordier teaches urea formaldehyde thermosetting molding compositions containing a latent accelerator (column 1, lines 26–50). The latent accelerator of Cordier is selected from the group consisting of an organic acid having the formula:

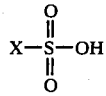

esterified with various alcohols including

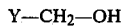

wherein X is phenyl or alkyl phenyl, such as $CH_3$-$C_6H_4$ (o- or p- tolyl), and Y is alkyl, hydroxy alkyl, alkoxy alkyl or aroxy alkyl (column 2, 1. 54 - column 3, 1. 25).

U.S. Pat. No. 4,083,830 discloses catalysis of melamine formaldehyde thermosetting resin systems with polyalkylaromatic sulfonic acids (Abstract; column 2, 11. 12-25).

U.S. Pat. No. 4,083,892 discloses high solids coating compositions comprising hydroxy functional copolymers and aminoplast resins (Abstract; column 1, 11. 28-50; column 2, 11. 38-47).

U.S. Pat. No. 4,137,389 discloses high solids binder compositions comprising hydroxy functional acrylic resins (Column 3, 11. 16-49) and aminoplast crosslinking agents (column 8, 11. 20-22).

U.S. Pat. Nos. 2,681,897, 2,853,463, 3,082,184, 3,235,622, 3,269,994, 3,414,635 and 3,865,683 teach compositions comprising hydroxy functional materials and aminoplast crosslinking agents. Catalysts employed, if any, are conventional types.

DETAILED DESCRIPTION OF THE INVENTION

As discussed generally above, the compositions of the invention are thermosetting materials (i) comprising a film-forming material bearing hydroxyl functionality, which is either initially present in the composition or which is formed by in situ reaction, (ii) an amine-aldehyde crosslinking agent, and (iii) a latent reactive catalyst.

The preferred high solids coating compositions of the invention overcome disadvantages of prior art high solids compositions to provide a system which is particularly suitable for those applications requiring high gloss, hardness, durability, and high solvent and water resistance as well as a fast cure rate at low temperature, e.g., between about 75° C. and about 150° C., preferably between about 110° C. and about 130° C. The desirable characteristics of these preferred compositions of the invention result from the carefully controlled admixture of the particular components, including the latent reactive catalyst, to achieve substantially complete utilization of reactant functionality and a resultant highly crosslinked coating in a fast and efficient manner.

Each of the components of the compositions of the invention, in general, and the high solids coating compositions, in particular, are described hereinafter in greater detail.

Latent Reactive Catalyst

The latent reactive catalyst of the compositions of the invention comprises the reaction product of: p1 (i) a copolymer bearing pendent epoxy functionality, having a number average molecular weight ($M_n$) of between about 1500 and about 10,000 and a glass transition temperature (Tg) of between about 31 25° C. and about 70, said copolymer being prepared from between about 5 and about 30 weight percent of monoethylenically unsaturated monomers bearing glycidyl functionality and between about 70 and about 95 weight percent of other monoethylenically unsaturated monomers; and (ii) a sulfonic acid having the formula

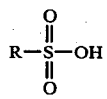

wherein R is selected from linear or branched alkyl groups and aryl groups.

The copolymer bearing pendent epoxy functionality and the sulfonic acid are reacted in such amounts that there are between about 0.3 and about 1, preferably between about 0.5 and about 0.9, acid groups per epoxy in the reaction mixture.

The epoxy functional copolymer used in the preparation of the latent reactive catalyst is prepared by conventional techniques known to those skilled in the art, e.g., free radical polymerization.

The monoethylenically unsaturated monomers bearing glycidyl functionality may be either glycidyl ethers or glycidyl esters. Preferably, however, the epoxy functional monomers are glycidyl esters of monoethylenically unsaturated carboxylic acids. Examples are glycidyl acrylates and glycidyl methacrylates.

As noted above, the remainder of the monomers forming the epoxy functional copolymer, used in the preparation of the latent reactive catalyst, i.e., between about 70 and about 95 weight percent, are other monoethylenically unsaturated monomers. These monoethylenically unsaturated monomers, are preferably alpha, beta olefinically unsaturated monomers, i.e., monomers bearing olefinic unsaturation between the two carbon atoms in the alpha and beta positions with respect to the terminus of an aliphatic carbon to carbon chain.

Among the alpha, beta olefinically unsaturated monomers which may be employed in such copolymers are acrylates (meaning esters of either acrylic or methacrylic acids) as well as mixtures of acrylates and vinyl hydrocarbons. Preferably, in excess of 50 weight percent of the total of the copolymer monomers are esters of $C_1$-$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

The manner of preparation of the latent reactive catalyst used in compositions of the invention will be more fully appreciated after reading the specific examples set forth hereinafter.

In the course of the curing of compositions of the invention, the latent reactive catalyst breaks down to form a sulfonic acid catalyst and a polymeric component.

The polymeric component is the residue of the epoxy functional copolymer which was reacted with the sulfonic acid to form the latent reactive catalyst. If an excess of epoxide functionality was present in the original reaction mixture used to form the latent reactive catalyst such that epoxide functionality on a given epoxy functional copolymer remains unreacted, epoxide will be present on the polymeric residue after breakdown of the latent reactive catalyst.

This epoxide remaining on the polymeric residue is then available to react with the acid groups of the generated sulfonic acid catalyst to form hydroxyl groups. These hydroxyl groups will in turn be available to crosslink with the amino crosslinking agent during cure and the polymeric residue, thus, will be chemically bound in the cured product.

As noted hereinbefore, at those reaction sites where sulfonic acid moieties become disconnected from the polymer as the composition is heated, ketone, aldehydes or other organic groups (but not epoxy or hydroxyl groups) will be formed.

Excess epoxy functionality on the epoxy functional copolymer reacted with the sulfonic acid to form the latent reactive catalyst can also have a beneficial effect on maintaining the shelf stability of coating compositions containing the latent reactive catalyst. This is particularly the case when no additional epoxy functionality is present in the composition, e.g., in the film forming material. As discussed hereinbefore, in those compositions wherein acid catalysts are employed there is often a problem with premature crosslinking. The invention described herein is intended to obviate problems associated with premature crosslinking by employing a latent catalyst such that the catalyst is not generated until the composition is being cured. Although the latent reactive catalysts of the invention essentially obviate this problem, there may under certain storage and handling conditions result a premature decomposition of the latent reactive catalyst to form a sulfonic acid catalyst. Such free catalyst can, of course, result in premature crosslinking by catalyzing the hydroxyl-/amino reaction. If, however, epoxy functionality is present in the composition, such as from an excess of epoxy on said epoxy functional copolymer as discussed above, the generated acid will react with that epoxy and, thus, will not prematurely catalyze the crosslinking reaction.

The sulfonic acid catalyst generated from the latent reactive catalyst as the compositions of the invention are heated pursuant to curing them, thus, not only catalyzes the hydroxyl/amino reaction, but also may react with other functionality present on the film forming material of the composition, e.g., epoxy functionality, to generate hydroxyl functionality in situ. This hydroxyl functionality is then available to participate in the catalyzed hydroxyl/amino crosslinking reaction. The sulfonic acid catalyst also may react with any residual epoxy on the polymeric component generated from the latent reactive catalyst. As discussed above, hydroxyl groups thus generated would also be available to participate in the crosslinking reaction.

In general, compositions of the invention may include between about 1 and about 10 weight percent of latent reactive catalyst based on the total weight of the reactive components in the composition. It will be appreciated by those skilled in the art, of course, that varying amounts of latent reactive catalyst may be included, depending on the temperature of cure, heat sensitivity of the catalyst, the amount of catalysis desired, the amount of functionality, such as epoxy, present in the film forming material which is reactive with the generated catalyst, etc. The approximate amount of catalyst which will be generated in situ from a given amount of the latent reactive catalyst, of course, may be readily determined. It will also be appreciated by those skilled in the art that the higher weight percents of latent relative catalyst within the above range will be particularly useful when the composition includes functionality, e.g., epoxy, which reacts with the generated catalyst to form hydroxyl functionality.

The amount of latent reactive catalyst used in the preferred high solids coating compositions of the invention will be discussed hereinafter.

Film Forming Material

As discussed above, film forming materials which either include hydroxyl functionality initially, generate hydroxyl functionality as a result of in situ reactions during the coating process or both include hydroxyl functionality initially and generate it in situ, are well known to those skilled in the art. Selection of those materials will be a matter of choice and it will be recognized that the use of the latent reactive catalyst described above is equally applicable to all such hydroxyl bearing film forming materials crosslinked with amino compound.

While it is intended that all such hydroxyl bearing film forming materials be included within the scope of the invention, several of these materials will be discussed below in greater detail for purposes of exemplification.

As discussed above, the film forming material may consist essentially of a compound which bears hydroxyl functionality prior to initiation of the curing reaction. In most coating compositions, such materials should have a number average molecular weight ($M_n$) of at least 150. A preferred type of hydroxy functional material which meets these limitations consists essentially of a copolymer bearing pendent hydroxyl functionality. One class of such materials have a number average molecular weight ($M_n$) of between about 1000 and about 20,000 and a glass transition temperature (Tg) of between about $-25°$ C. and about $-70°$ C. Such a copolymer may, for example, consist of between about 5 and about 30 weight percent of monoethylenically unsaturated monomers bearing hydroxyl functionality and between about 95 and about 70 weight percent of other monoethylenically unsaturated monomers.

The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

Although one of ordinary skill in the art will recognize that many different hydroxyl bearing monomers including those listed above could be employed, the preferred hydroxy functional monomers for use in the hydroxy functional resin(s) of the invention are $C_5$-$C_7$ hydroxy alkyl acrylates and/or $C_6$-$C_8$ hydroxy alkyl methacrylates, i.e., esters of $C_2$-$C_3$ dihydric alcohols and acrylic or methacrylic acids.

The remainder of the monomers forming the hydroxy functional copolymer, i.e., between about 90 and about 70 weight percent, are other monoethylenically unsaturated monomers. These monoethylenically unsaturated monomers, are preferably alpha, beta olefinically unsaturated monomers, i.e., monomers bearing olefinic unsaturation between the two carbon atoms in the alpha and beta positions with respect to the terminus of an aliphatic carbon to carbon chain.

Among the alpha, beta olefinically unsaturated monomers which may be employed in such copolymers are acrylates (meaning esters of either acrylic or methacrylic acids) as well as mixtures of acrylates and vinyl hydrocarbons. Preferably, in excess of 50 weight percent of the total of the copolymer monomers are esters of $C_1$-$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons or employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

As mentioned above, the film forming material may contain both hydroxyl functionality and a material which reacts in situ to form hydroxyl functionality. Exemplary of one such film forming material would be a material which consists essentially of a single copolymer bearing both hydroxyl and epoxy functionality, the epoxy functionality reacting with the acid functionality of the generated sulfonic acid catalyst as discussed above to form hydroxyl functionality which thereafter may also react with the aminealdehyde crosslinking agent. Such a bifunctional copolymer may be of the acrylic type similar to the hydroxy functional copolymer discussed above. A preferred bifunctional copolymer of this type has a number average molecular weight ($M_n$) of between about 1500 and about 6,000, and a glass transition temperature (Tg) of between about −25° C. and about 70° C., preferably between about −10° C. and about 50° C. Such a copolymer preferably is formed from between about 5 and 25 weight percent of monoethylenically unsaturated monomers bearing glycidyl functionality and between about 5 and about 25 weight percent of monoethylenically unsaturated monomers bearing hydroxyl functionality, with the total of the monoethylenically unsaturated monomers bearing either said glycidyl functionality or said hydroxyl functionality being not greater than about 30 weight percent of the monomers in the copolymer. The monoethylenically unsaturated monomers bearing glycidyl functionality may be either glycidyl ethers or glycidyl esters. Preferably, however, the epoxy functional monomers are glycidyl esters of monoethylenically unsaturated carboxylic acids. Examples are glycidyl acrylates and glycidyl methacrylates. The remainder of the monomers in the copolymer, i.e., between about 90 and about 70 weight percent, consist of other monoethylenically unsaturated monomers, such as those described above.

Also as mentioned above, the film forming material may consist essentially of a compound which reacts in situ to form hydroxyl functionality, i.e., a compound not initially including hydroxyl functionality. Such a compound could be, for example, a copolymer such as those described above, but bearing only glycidyl functionality. Such a copolymer bearing pendent epoxy functionality should have a number average molecular weight ($M_n$) of between about 1500 and about 10,000, preferably between about 2,000 and about 6,000, and a glass transition temperature (Tg) of between about −25° C. and about 70° C., preferably between about −10° C. and about 50° C. A preferred copolymer of this type consists of between about 10 and about 30 weight percent of monoethylenically unsaturated monomers bearing glycidyl functionality and between about 90 and about 70 weight percent of other monoethylenically unsaturated monomers, as discussed above.

Still another compound bearing epoxy functionality which may be employed when solely epoxy functionality, which in turn will react with the acid functionality created by breakdown of the latent reactive catalyst to form hydroxyl functionality, is desired, is a polyepoxide resin having a number average molecular weight of between about 140 and about 3,000, preferably between about 300 and about 2,000. The term polyepoxide resin as used herein means epoxide compounds or polymers containing two or more epoxide groups. Such polyepoxide resins are preferably selected from aliphatic, cycloaliphatic and aromatic polyepoxides falling within the stated molecular weight range. Such polyepoxides are well known compositions and any of these may be employed. Among the many suitable types of polyepoxides are those disclosed by the U.S. Pat. Nos. 3,404,018; 2,528,539; 2,528,360; 3,198,850; 3,960,979; and 4,018,848.

U.S. Pat. No. 3,404,018 discloses several particularly suitable types of polyepoxides including: (1) polyglycidyl ethers of polyhydric alcohols and polyhydric phenols; (2) epoxidized esters of polyethylenically unsaturated monocarboxylic acids; (3) glycidyl esters of polybasic acids; (4) epoxidized esters of unsaturated monohydric alcohols and polycarboxylic acids; and (5) epoxidized polymers and copolymers of diolefins. Many polyepoxides other than those recited in this or other referenced patents will be apparent to those skilled in the art.

As also mentioned above, there may be those instances when the film forming material desirably comprises separate compounds, one or more bearing hydroxyl functionality and one or more others bearing functionality which reacts in situ to form hydroxyl functionality. Such film forming materials might, for example, consist of the above noted hydroxy functional copolymer combined with the epoxy functional copolymer discussed above or the polyepoxide resin discussed above. Various other combinations of materials, of course, will be apparent to those skilled in the art. Still other film forming materials are exemplified in the detailed examples set forth hereinafter.

Amine Aldehyde Crosslinking Agent

Amine-aldehyde crosslinking agents suitable for crosslinking hydroxyl bearing materials in accordance with the invention are well known in the art and their selection will be obvious to those skilled in the art.

These crosslinking agents, in general, comprise the condensation product of an amino compound with an aldehyde or aldehyde precursor. Exemplary of these types of materials are a urea-formaldehyde condensate. Exemplary of other materials within the very broad class of crosslinking agents contemplated are condensation reaction products of formaldehyde with substituted melamine, benzoguanamine and substituted benzoguanamine.

Preferred members of the broad class of crosslinking agents are alkylated melamine- and urea-formaldehyde resins. Particularly preferred are methylated melamine-formaldehyde resins such as hexamethoxymethylmelamine. These liquid crosslinking agents have substantially one hundred percent (100%) nonvolatile content as measured by the foil method at 45° C. for 45 minutes. Some particularly well known crosslinking agents are amino resins sold by American Cyanamid under the trademark "Cymel". In particular, Cymel 301, Cymel 303, and Cymel 1156, all alkylated malamine-formaldehyde resins, are useful in compositions falling within the scope of this invention.

For further discussion of amine-aldehyde crosslinking agents see U.S. Pat. Nos. 2,222,506; 2,226,518; 2,227,223; 2,227,708; 2,322,979; 2,327,984; 2,323,357; 3,326,265; 2,350,894; 2,681,897; 2,853,463; 3,082,184; 3,235,622; 3,269,994; 3,414,635; 3,865,683; 4,083,830; 4,083,892; and 4,137,389.

Of course, the amount of crosslinking agent employed in any given composition is a matter of choice depending upon the final properties desired and the nature of the other materials in the coating composition.

Preferred High Solids Coating Compositions

As indicated above, the high solids coating compositions within the scope of the invention include a film-forming resin bearing epoxy functionality or both epoxy and hydroxyl functionality. Materials suitable for use in preparing the high solids compositions of the invention are the acrylic copolymers bearing glycidyl functionality or glycidyl and hydroxyl functionality and the polyepoxide resins, all of which are described hereinbefore.

In addition to the film-forming resin and the latent reactive catalyst the compositions also include an amine-aldehyde crosslinking agent generally described above and an optional hydroxy functional additive in an amount up to 45 weight percent of the total of the four major components of the composition. The hydroxy functional additives provide additional hydroxyl functionality so as to provide a more intimate crosslinked structure in the final cured product. These additives are typically selected from various polyols having a number average molecular weight ($M_n$) of between about 150 and about 6,000, preferably between about 400 and about 2,600. As used herein the term polyol means a compound having two or more hydroxyl groups.

The polyols useful for the preferred high solids compositions of the invention preferably are selected from the group consisting of: (i) hydroxy functional polyesters; (ii) hydroxy functional polyethers; (iii) hydroxy functional oligoesters; (iv) monomeric polyols; (v) hydroxy functional copolymers produced by free radical polymerization of monoethylenically unsaturated monomers, one of which bears hydroxy functionality and which is included in the copolymer in an amount ranging from about 2.5 to about 30 weight percent of the copolymer and (vi) mixtures of (i)–(v).

The hydroxy functional polyesters useful in these preferred compositions are preferably fully saturated products prepared from aliphatic dibasic acids containing 2–20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, neopentyl glycol, 1,4-cyclohexane dimethylol, 1,6-hexamethylene glycol and 2-ethyl-2-methyl-1,3 propane diol. The molecular weight of these materials ranges from about 200 to about 2,500 and the hydroxyl number ranges from about 30 to about 230. The hydroxyl number is defined as the number of milligrams of potassium hydroxide needed for each gram of sample to neutralize the acetic acid generated during the reaction between the polyol and the excess acetic anhydride. The polyester polyols utilized in the compositions are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols, and mixtures thereof.

Among useful polyether diols are polytetramethylene ether glycol, polyethylene glycol, polypropylene glycol and the like.

The hydroxy functional oligoesters useful as hydroxy functional additives in the preferred compositions of the invention are oligoesters preferably having a molecular weight of between about 150 and about 3,000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

The oligoester prepared by reacting a dicarboxylic acid with an alkylene oxide is a low molecular weight adduct which has a narrow molecular weight distribution when compared to similar compositions made by normal polyester manufacturing techniques. The adduct is prepared by reacting a dibasic carboxylic acid with alkylene oxides, preferably ethylene oxide or propylene oxide, in the presence of a catalyst. Preferred dicarboxylic acids are $C_6$–$C_{12}$ aliphatic acids such as adipic acid, azelaic acid, sebasic acid or dodecane dicarboxylic acid. Mixtures of these acids or mixtures of the aliphatic dicarboxylic acids with aromatic dicarboxylic acids also yield suitable hydroxy functional oligoesters.

The preparation of oligoesters from monocarboxylic acids and polyepoxides is well known and is described, for example, in U.S. Pat. Nos. 2,456,408 and 2,653,141. Numerous hydroxy functional oligoesters within this general category will be apparent to those skilled in the art.

A third type of hydroxy functional oligoester, i.e., those prepared by reaction of a hydroxy functional monocarboxylic acid with an epoxide is described in U.S. Pat. Nos. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein. Numerous monoepoxide materials suitable for this purpose will be apparent to those skilled in the art.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxyl bearing copolymer described above for use as a film-forming material for compositions of the invention, in general may also be used as a hydroxy functional additive in the preferred high solids coating compositions of the invention.

It is the reactive nature of the catalyst generated during cure which allows the composition to cure rapidly at a low temperature. As indicated generally above, the acid functionality of the catalyst reacts with the epoxy functionality of the epoxy functional film-former, or with any excess epoxy on the polymeric residue formed by breakdown of the latent reactive catalyst, to form an ester and a hydroxyl group. This hydroxyl group, as well as an organic hydroxyl group on the catalyst itself, any hydroxyl groups in the film-former in addition to the epoxy functionality and any optional hydroxy groups included in the composition in the form of hydroxy functional additive crosslinks with the amine-aldehyde crosslinking agent. It is critical to achieving the desired results of the high solids coating compositions of this invention, i.e., in making them suitable for use as automotive topcoats, that the amount of generated catalyst be sufficient to convert substantially all of the epoxy funtionality in the composition to the desired hydroxy functionality by esterification reaction. To this end, the latent reactive catalyst is included in the composition in an amount ranging from about 1 to about 5 weight percent based on the total weight of the film former, crosslinking agent, optional hydroxy functional component and the latent reactive catalyst itself. The amount of acid functionality from the generated catalyst need not be in stoichiometric amounts to the epoxy functionality. This is because of the fact that during curing of the high solids coating composition, residual water present in the composition hydrolyzes some of the esterified product back to acid and this hydrolyzed product then, in turn, reacts with additional epoxy functionality. Of course, the amount of latent reactive catalyst which should be included in the composition in order to convert substantially all epoxy to hydroxyl and still maintain a sufficient level of catalyst to effectively catalyze the hyroxyl/amino crosslinking reaction, will vary within the above range.

As also indicated above, the amine-aldehyde materials function as a crosslinking agent by reacting with hydroxyl functionality present in the composition. In the preferred high solids compositions of the invention this hydroxyl functionality may be present (i) in an organic hydroxyl group on the polymeric residue resulting from generation of the catalyst; (ii) as a hydroxyl group on the film-formed in those cases where that component bears hydroxy as well as epoxy functionality; (iii) as a hydroxyl group on the optional hydroxy functional additive; or (iv) as a result of esterification of epoxy functionality of the film-former or excess epoxy functionality on the polymeric residue.

In order to achieve the outstanding properties which make these preferred high solids coating compositions particularly useful as automotive topcoat materials, it is essential that the amount of amine-aldehyde crosslinking agent be sufficient to substantially completely crosslink the hydroxyl functionality in the coating composition. Therefore, the amine-aldehyde resin crosslinking agent should be included in the composition in an amount ranging from about 15 to about 45 weight percent based on the total weight of the four above discussed major components.

Other Materials

Of course, it should be recognized that compositions within the scope of this invention, including the preferred high solids coating compositions, may include other conventional components. These include, but are not limited to, antioxidants, U.V. absorbers, solvents, surface modifiers, wetting agents, pigments, fillers, etc.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

(a) The following mixture of monomers was used for a polymer synthesis:

|  | Wt. (gram) | Wt. % |
|---|---|---|
| Butylmethacrylate | 127.5 | 17 |
| Ethylhexyl acrylate | 180 | 24 |
| Glycidyl methacrylate | 195 | 26 |
| Methyl methacrylate | 210 | 28 |
| Styrene | 37.5 | 5 |

37 grams t-butyl perbenzoate is added to the above monomer mixture the resulting solution added over a period of one hour and 10 minutes to 500 grams of refluxing methyl amyl ketone refluxing methyl amyl ketone under nitrogen. Heating and stirring is continued for half an hour after the addition is complete and then two grams of t-butylperbenzoate are added portionwise. The reaction mixture is refluxed for two more hours and then allowed to cool to room temperature. The calculated Tg of the polymer obtained is 9° C. and the solution viscosity is 41 Sec. #4 Ford cup.

Two hundred fifty (250) grams of the above polymer solution is placed in a separate flask and a 50% acetone solution of 52 grams of p-toluene sulfonic acid hydrate is added to it dropwise with continuous cooling and stirring with ice. After the addition is complete, the reaction mxture is stirred at room temperature for five hours.

(b) A hydroxy acrylic copolymer is prepared from the following monomers:

|  | Wt. (grams) | Wt. % |
|---|---|---|
| Butyl methacrylate | 900 | 45 |
| Hydroxyethyl acrylate | 500 | 25 |
| Methyl methacrylate | 400 | 20 |
| Styrene | 200 | 10 |

One hundred (100) grams tert-butyl perbenzoate is added to the above monomer mixture and the resulting solution is added dropwise over a period of two hours to 1600 grams of refluxing methyl amyl ketone (under nitrogen). The heating and stirring is continued for half an hour after the addition is complete and then three (3) grams of tert-butyl perbenzoate are added portionwise to the reaction mixture. The refluxing is continued for one more hour and then the reaction mixture is allowed to cool to room temperature. The molecular weight is determined by Gel Permeation chromatography: $M_n = 2760$, $M_w/M_n = 2.1$.

Eighty-five (85) parts of polymer solution (b) are mixed 23.4 parts of hexamethoxymethyl melamine (Cymel 301), eleven (11) parts of n-butyl acetate and 3.5 parts of polymer acid reaction product solution (a). The resulting formulation is applied by spraying to primed steel panels. The panels are baked at 140° C. for 20 minutes to obtain clear coatings with excellent hardness, adhesion, gloss and solvent (xylene and methyl ethyl ketone) resistance.

EXAMPLE 2

A hydroxy acrylic polymer is prepared from the following monomers:

|  | Wt. % |
|---|---|
| Butyl methacrylate | 26 |
| Ethylhexyl acrylate | 20 |
| Hydroxyethyl acrylate | 30 |
| Styrene | 24 |

The preparation is carried out in the same way as outlined in Example 1(b) by using cellusolve acetate as the solvent and tert-butyl peroctoate (5% of monomers) as initiator to obtain a 70% solution of the polymer. The calculated Tg of the polymer is −7° C. and the molecular weight from Gel Permeation Chromatography is $Mn = 3070$, $Mw/Mn = 2.2$.

Thirty-seven (37) parts of the above polymer solution are mixed with 13.2 parts of Cymel 301 (American Cyanamid), 12 parts of n-butyl acetate and 2.1 parts of polymer-sulfonate solution from Example 1(a). The resulting formulation is applied by spraying to primed steel panels. The panels are baked at 130° C. for 20 minutes to obtain coatings with excellent gloss, hardness, adhesion and solvent (xylene and methyl ethyl ketone) resistance.

EXAMPLE 3

Three hundred fifty (350) parts of TiO$_2$ are mixed with 350 parts of Acryloid OL-42 (Rohm and Haas chem. Co.) and 25 parts of n-butyl acetate. The above mixture is taken up in a porcelain bottle containing porcelain beads and put on a roller mill for 16 hours. Forty parts of this millbase are mixed with twenty-seven parts of acrylic polymer from Example 1(b), 15.2 parts of Cymel 301 (American Cyanamid), 21 parts of n-butyl acetate and 4.3 parts of the polymer-sulfonate solution from Example 1(a). The resulting formulation is applied by spraying to primed steel panels which are baked at 135° C. for 20 minutes to obtain coatings with excellent hardness, adhesion and solvent (xylene and methyl ethyl ketone) resistance.

EXAMPLE 4

Three hundred (300) parts of $TiO_2$ and 150 parts of Ferrite Yellow are mixed with 300 parts of Acryloid OL-42 (Rohm and Haas Chem. Co.), 4.2 parts of dispersing agent BYK P104S (Mellinckrodt) and 115 parts of n-butyl acetate; the millbase is prepared as described in Example 3.

Fifty parts of the above millbase are mixed with forty-five parts of Cymel 301, 15 parts of n-butyl acetate, 2.3 parts of sulfonate catalyst from Example 1(a), and two parts of hydroxy ester Desmophen KL5-2330 (Rohm and Haas Chem. Co.). The resulting formulation is applied by spraying to primed steel panels which are baked at 140° C. for 15 minutes to obtain yellow coatings with excellent gloss, adhesion, hardness and solvent (xylene and methyl ethyl ketone) resistance.

EXAMPLE 5

Five (5) parts of caprolactone based hydroxy ester PCP-0300 (Union Carbide) and four (4) parts of methyl amyl ketone are added to the paint composition described in Example 4; the resulting formulation is applied by spraying to primed steel panels. The panels were baked at 140° C. for 20 minutes to obtain coatings with excellent hardness, adhesion, gloss and solvent (xylene and methyl ethyl ketone) resistance.

EXAMPLE 6

Ten (10) parts of Phthalo blue pigment are mixed with 120 parts of acrylic polymer from Example 2 and 10 parts of n-butyl acetate; the millbase is ground as described in Example 4. Twenty-five (25) parts of the above millbase are mixed with 37 parts of acrylic polymer from Example 2, 20 parts of Cymel 301, 5 parts of aluminum flakes (65% in naphtha), 15 parts of n-butyl acetate, and 4.1 parts of polymer-sulfonate solution from Example 1(a). The resulting formulation is sprayed on primed steel panels in three coats with one minute flash times between coats. After six minutes final flash at room temperature, the panels are baked at 135° C. for 20 minutes to obtain blue metallic coatings with excellent hardness, adhesion and solvent (xylene and methyl ethyl ketone) resistance.

EXAMPLE 7

In the pain formulation described in Example 1, 23 parts of hexabutoxymethyl melamine (Cymel 1156) are employed as the crosslinking agent. The paint is applied to steel panels by spraying in three coats baked at 135° C. for 20 minutes to obtain hard glossy coatings with excellent adhesion and solvent (xylene and methyl ketone) resistance.

EXAMPLE 8

In the paint composition described in Example 5, 56 parts of butoxymethyl glycoluril (Cymel 1170) for Cymel 301 used therein. The resulting formulation is spray applied to primed steel panels which are baked at 140° C. for 20 minutes to obtain coatings with excellent gloss, hardness, adhesion and solvent (xylene and methyl ethyl ketone) resistance.

EXAMPLE 9

The formulation described in Example 2 is repeated by employing 16 parts of the ethoxymethoxy benzoguanamine (Cymel 1123) as the crosslinking agent. The formulation is applied by spraying to primed steel panels and baked at 135° C. for 20 minutes to obtain hard, glossy coatings with excellent solvent (xylene and methyl ethyl ketone) resistance.

EXAMPLE 10

Six parts of hydroxy ester PCP-0300 (Union Carbide) are added to the composition described in Example 2 and 21 parts of butoxymethyl urea resin (Beetle 80, American Cyanamid) are employed as crosslinking agent instead of Cymel 301 used therein. The resulting formulation was applied by spraying to primed steel panels which are baked at 140° C.

EXAMPLE 11

(a) An epoxy functional copolymer is prepared from the following monomers:

|   | Wt. (grams) |
|---|---|
| Butyl methacrylate | 120 |
| Ethyl hexyl acrylate | 160 |
| Glycidyl methacrylate | 145 |
| Methyl methacrylate | 250 |
| Styrene | 25 |

The polymerization is carried out as outlined in Example 1 by employing 500 grams of methyl amyl ketone and 30 grams of t-butyl perbenzoate. The addition of initiator and the monomer mixture is completed in two hours and the reaction mixture is refluxed for one additional hour. Two grams of the initiator are then added and the reaction mixture is refluxed for two hours.

Two hundred (200) grams of the above polymer solution are placed in a separate flask and a 50% acetone solution of 24 grams of phenyl sulfonic acid is added to it dropwise with continuous stirring and cooling. After the addition is complete, the reaction mixture is stirred at room temperature for two hours. Five parts of this solution are added to the formulation described in Example 1 instead of the catalyst used therein. The resulting formulation is applied by spraying to primed steel panels. The panels are baked at 140° C. for 20 minutes to obtain clear coatings with excellent hardness, adhesion and solvent (xylene and methyl ethyl ketone) resistance.

EXAMPLE 12

The following monomers are employed in synthesis of a polymer:

|   | Wt. % |
|---|---|
| Butyl methacrylate | 40 |
| Glycidyl methacrylate | 15 |
| Methyl methacrylate | 40 |
| Styrene | 5 |

The polymerization is carried out in methyl amyl ketone by employing 1.8% (by wt. of the monomers) of the initiator. The molecular weight from Gel Permeation Chromatography is found to be $M_n=5750$, $Mw/M_n=2.4$. The solids content was found to be 54% by weight.

One hundred grams of the above polymer solution is placed in a round bottom flask and cooled with ice-water mixture. A 50% acetone solution of five grams of methyl sulfonic acid is added dropwise continuous stirring and cooling. After the addition is complete, the reaction mixture is stirred at room temperature for two hours. Seven parts of this reaction mixture are employed as catalyst in the formulation of Example 2 instead of the catalyst used therein. The resulting formulation is applied by spraying to primed steel panels which are baked at 140° C. for 20 minutes to obtain coatings with excellent hardness, adhesion and solvent (xylene and methyl ethyl ketones) resistance.

EXAMPLE 13

Ten parts of 2-ethyl-1, 3-hexane diol and 4 parts of hexamethoxymethyl melamine (Cymel 301) are added to the formulation described in Example 1. The resulting formulation is applied to primed steel panels by spraying in three coats with intermediate flash of one minute and a final flash of five minutes. The panels are baked at 140° C. for 20 minutes to obtain a clear coating with excellent hardness, adhesion, gloss and solvent (xylene and methyl ethyl ketone) resistance.

EXAMPLE 14

By following the procedure described in Example 1 a copolymer is prepared from the following monomers:

|  | Wt. % |
|---|---|
| Butyl methacrylate | 49 |
| Glycidyl methacrylate | 20 |
| Hydroxypropyl methacrylate | 10 |
| Methyl methacrylate | 16 |
| Styrene | 5 |

The calculated Tg of the copolymer is 43° C. and solids content was found to be 52%.

Eleven parts of the above polymer solution, 10.5 parts of hydroxy-sulfonate and 3 parts of Cymel 301 are added to the formulation described in Example 1. The resulting formulation is applied by spraying to primed steel panels which are baked at 140° C. for 20 minutes to obtain coatings with excellent hardness, adhesion and solvent (xylene and methyl ethyl ketone) resistance.

EXAMPLE 15

Fifteen (15) parts of glycidyl methacrylate copolymer from Example 1, 23 parts of hydroxy sulfonate from Example 1, seven parts of Cymel 301 and nine parts of n-butyl acetate are added to the formulation described in Example 1. The resulting formulation is applied by spraying to primed steel panels which are baked at 140° C. for 20 minutes to obtain coatings with excellent hardness, adhesion and solvent (xylene and methyl ethyl ketone) resistance.

EXAMPLE 16

Three parts of cycloaliphatic epoxy Araldite CY-178 (Ciba-Geigy), 21 parts of polymersulfonate from Example 1, 7 parts of Cymel 301 and 6 parts of n-butyl acetate are added to the formulation described in Example 2. The resulting formulation is applied by spraying to primed steel panels which are baked at 140° C. for 20 minutes to obtain coatings with excellent hardness, adhesion and solvent resistance.

In view of this disclosure, many modifications of this invention will be apparent to those skilled in the art. It is intended that all such modifications which fall within the true scope of this invention be included within the terms of the appended claims.

What is claimed is:

1. A liquid, thermosetting high solids coating composition which is adapted for low temperature bake applications, which contains greater than about 55% by weight of nonvolatile solids, and which, exclusive of pigments, solvents and other nonreactive components, consists essentially of:

(A) a bifunctional copolymer bearing hydroxyl functionality and pendent epoxy functionality, having a number average moleculer weight ($M_n$) of between about 1,500 and about 10,000 and a glass transition temperature ($T_g$) of between about $-25°$ C. and about 70° C., said copolymer consisting essentially of (i) between about 5 and about 25 weight percent of monoethylenically unsaturated monomers bearing glycidyl functionality and between about 5 and about 25 weight percent of monoethylenically unsaturated monomers bearing hydroxyl functionality, with the total of said glycidyl and hydroxy functional monomers being not greater than about 30 weight percent of other monoethylenically unsaturated monomers in said bifunctional copolymer and (ii) between about 90 and about 70 weight percent of other monoethylencially unsaturated monomers;

(B) a latent reactive catalyst comprising the reaction product of (i) a monofunctional copolymer bearing pendent epoxy functionality, having a number average molecular weight ($M_n$) of between about 1,500 and about 10,000 and a glass transition temperature ($T_g$) of between about $-25°$ C. and about 70° C., said copolymer being prepared from between about 5 and about 30 weight percent of monoethylenically unsaturated monomers bearing glycidyl functionality and between about 70 and about 95 weight percent of other monoethylenically unsaturated monomers; and (ii) a sulfonic acid having the formula

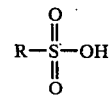

wherein R is selected from linear or branched alkyl groups and aryl groups, said copolymer bearing pendent epoxy functionality and said sulfonic acid being reacted in such amounts that there are between 0.3 and about 1 acid groups per epoxy in the reaction mixture.

(C) an amine-aldehyde crosslinking agent; and (D) up to about 45 weight percent of a hydroxy functional additive having a member average molecular weight ($M_n$) of between about 150 and about 6,000, said latent reactive catalyst being included in said composition in an amount ranging from about 0.5 to about 5 weight percent, said amine-aldehyde crosslinking agent being included in said composition in an amount ranging from about 15 to about 45 weight percent, said weight percents being based on the total weight of (A), (B), (C) and (D).

2. A composition in accordance with claim 1 or wherein said monoethylenically unsaturated monomers bearing glycidyl functionality and used in preparing said copolymer (A) are selected from glycidyl esters and glycidyl ethers.

3. A composition in accordance with claim 2 wherein said monoethylenically unsaturated monomers bearing glycidyl functionality are selected from glycidyl esters of monoethylenically unsaturated carboxylic acids.

4. A composition in accordance with claim 1 wherein said monoethylenically unsaturated monomers bearing hydroxyl functionality in said bifunctional copolymer are selected from the group consisting of hydroxyalkyl acrylates formed by the reaction of $C_2$–$C_5$ dihydric alcohols and acrylic or methacrylic acids.

5. A composition in accordance with claim 1 or wherein said other monoethylenically unsaturated monomers used in preparing said copolymer (A) are selected from the group consisting of acrylates and other monoethylenically unsaturated vinyl monomers.

6. A composition in accordance with claim 5 wherein said acrylate monomers comprise at least about 50 weight percent of the total monomers in said copolymer and are selected from the group consisting of esters of $C_1$–$C_{12}$ monohydric alcohols and acrylic or methacrylic acids.

7. A composition in accordance with claim 1 wherein said monoethylenically unsaturated monomers bearing glycidyl functionality and used in preparing said copolymer employed in the preparation of said latent reactive catalyst are selected from glycidyl esters and glycidyl ethers.

8. A composition in accordance with claim 7 wherein said monoethylenically unsaturated monomers bearing glycidyl functionality are selected from glycidyl esters of monoethylenically unsaturated carboxylic acids.

9. A composition in accordance with claim 8 wherein said glycidyl esters are esters of acrylic or methacrylic acids.

10. A composition in accordance with claim 7 wherein said copolymer bearing pendent epoxy functionality and said sulfonic acid employed in the preparation of said latent reactive catalyst are reacted in such amounts that there are between about 0.5 and about 0.9 acid groups per epoxy in the reaction mixture.

11. A composition in accordance with claim 1 or wherein said other monoethylenically unsaturated monomers used in preparing said copolymer employed in the preparation of said latent reactive catalyst are selected from the group consisting of acrylate monomers and other monoethylenically unsaturated vinyl monomers.

12. A composition in accordance with claim 11 wherein said acrylate monomers used in preparing said copolymer employed in preparation of said latent reactive catalyst comprise at least about 50 weight percent of the total monomers in said copolymer.

13. A composition in accordance with claim 1 or wherein said amide-aldehyde crosslinking agent is selected from the group consisting of condensation products of formaldehyde with melamine, substituted melamine, urea, benzoguanamine, and substituted benzoguanamine, and mixtures of said condensation products, and is included in an amount of between about 15 and about 45 weight percent based on the total weight of (A), (B), (C) and (D).

14. A composition in accordance with claim 1 or wherein said hydroxyl functional additive is selected from the group consisting of (i) hydroxyl functional polyesters, (ii) hydroxyl functional polyethers, (iii) hydroxyl functional oligoesters, (iv) monomeric polyols, (v) hydroxyl functional copolymers formed from monoethylenically unsaturated monomers, one or more of which bears hydroxy functionality and which is included in said copolymer in amounts ranging from about 10 to about 30 weight percent of said copolymer, and (vi) mixtures of (i)–(v).

* * * * *